United States Patent [19]

Bauer et al.

[11] 4,297,917
[45] Nov. 3, 1981

[54] POWER DISTRIBUTION GEARING FOR DOUBLE HELIX EXTRUDERS

[75] Inventors: Erwin Bauer, Weinstadt; Ralf Davids, Illingen; Gerhard Gotz, Ludwigsburg; Hilmar Jussen, Marbach; Heinrich Arndt, Augsburg; Louis Kummel, Stadtbergen; Rudolf Morhart; Erich Pollak-Banda, both of Augsburg, all of Fed. Rep. of Germany

[73] Assignees: Werner & Pfleiderer, Stuttgart; Zahnraderfabrik Renk Aktiengesellschaft, Augsburg, both of Fed. Rep. of Germany

[21] Appl. No.: 76,606

[22] Filed: Sep. 18, 1979

[30] Foreign Application Priority Data

Sep. 27, 1978 [DE] Fed. Rep. of Germany ....... 2841985

[51] Int. Cl.³ .............................................. F16H 37/06
[52] U.S. Cl. ........................... 74/665 G; 74/665 GA; 74/665 GD
[58] Field of Search ......... 74/665 G, 665 GA, 665 F, 74/665 P, 665 A, 665 B, 665 GD, 413, 421 R; 425/204; 366/83, 84, 85, 86

[56] References Cited

U.S. PATENT DOCUMENTS

| 868,355 | 10/1907 | Mueller | 425/204 |
|---|---|---|---|
| 3,894,725 | 7/1975 | Schafer | 74/665 GA X |
| 3,905,250 | 9/1975 | Sigg | 74/665 B |
| 3,926,064 | 12/1975 | Durand | 74/413 X |
| 4,056,018 | 11/1977 | Chung | 74/665 P |

FOREIGN PATENT DOCUMENTS

| 2261511 | 7/1973 | Fed. Rep. of Germany | 425/204 |
|---|---|---|---|
| 1279607 | 6/1972 | United Kingdom | 74/665 GA |
| 1421704 | 1/1976 | United Kingdom | 74/413 |

*Primary Examiner*—Kenneth Dorner
*Attorney, Agent, or Firm*—Weingarten, Schurgin & Gagnebin

[57] ABSTRACT

A driving gear assembly for a double helix extruder. The assembly includes a multiple power path from a transmission gear to produce synchronism in the extruder helix shafts. The structure of the gearing enables a simple adjustment of the proper mesh of the extruder helices when mounting the gearing by mere disengagement and re-engagement of a (normally not disengageable) tooth coupling.

5 Claims, 10 Drawing Figures

POWER DISTRIBUTION GEARING FOR DOUBLE HELIX EXTRUDERS

FIELD OF THE INVENTION

The invention relates to a driving gear for double screw extruders with synchronous extruder helix shafts.

DISCUSSION OF THE PRIOR ART

In driving gear units for double helix extruders the distance between the axes of the extruder helix shafts is predicated by the diameter of the engaging extruder helices. Therefore the gear diameters on the extruder helix shafts are predicated upon this configuration, and the gear diameters may not be radically larger than those of the extruder helix shafts themselves. Consequently, these gears cannot engage with each other, but must be arranged axially staggered relatively to each other on the extruder helix shafts.

Because of the requirement in the terms of current technology that a progressively greater torque must be transferred, despite the limit stressing employed in these gears, the application of special torque transfer principles and gear designs has become necessary, as for example the principle of the dual or multiple power path in association with a multiple engagement of these gears.

In this context a consistent and even multiple power transmission path must be assured in every loading condition of the extruder helix shafts. The geometrically perfect and non-contact engagement (exact and synchronous relative engagement of both extruder helices during rotation without mutual contact) therefore requires at every loading condition absolute synchronization of the helices and compensation for the different torsions of the helix shafts originating from the different lengths of the shaft sections necessitated by the aforementioned axial offset of the helix-shaft gears. The adjustment or calibration of the geometrically perfect and non-contact engagement of the extruder helices should be able to be accomplished without imposing complicating requirements in manufacture and in assembly by means of relatively simple techniques made possible by the gearing design itself.

In addition, the drive of the extruder helix-shaft gears must be as free of transverse stresses as possible. Finally, as well, the gear teeth and the gear housing must be de-stressed and relieved of the back pressure forces which impact upon the extruder helix shafts from the operating procedure itself.

Through German patent publication No. 1,031,075 there is shown a torque balance for a two-way gear, in which a speed-transforming transmission is effected from one input drive shaft to the output shaft by means of not carrying in bearing the input or output gear of the drive and achieving its drive and output through a universal joint toothed coupling. However, it should be noted that the disclosure of this publication neither shows nor suggests means to drive two extruder helix shafts from one input shaft synchronously through symmetric multiple power transmission paths.

On the basis of German patent application No. 2,647,102 the technique is known of diverting in a drive for the counter-rotating helices of an extruder the drive power for the second helix from a drive gear on the first helix-shaft and to transmit it over a multi-power path to the drive gear of the second helix-shaft, in which technique a purely mechanical or a hydraulic device provides the torque balance. However, in this gearing configuration the entire drive torque from the first helix-shaft must first be led through such shaft lengthened to the rear, which in its diameter, for reasons stated initially, cannot be made larger than the meshing gears themselves and is already fully stressed and loaded to transfer the torque. The multiple power path to the extruder helices is effected through the first helix-shaft to the first helix, on the one hand, and through another path from the output gear on the first helix shaft over intermediary gears to the other helix-shaft of the extruder. Thus, the actual shafts of the extruder helices are only half exploited insofar as the torque is concerned. A gearing configured in this manner is basically not capable of transmitting the highest possible torque through its extruder helix shafts.

U.S. Pat. No. 3,434,365 indicates very generally that defects in gear tooth alignment can be compensated by mounting an intermediate pivotably mounted idler gear and that shaft misalignments can be compensated in this manner as well. No suggestion can be derived from this publication for application in multiple power paths or extruder drives or both.

Of these various gear and drive variants which have become known to date no one of them can satisfy all of the requirements set forth above.

SUMMARY OF THE INVENTION

The synchronous directional, rotational and torque-synchronous drive of the helices of a double helix extruder is realized to satisfy these requirements in the sense of this invention by means of a combination of the following characteristics:

(a) arrangement of one or several transmission gear reduction stages to drive a distribution gear of a first multiple power path;

(b) arrangement of two double joint toothed couplings between this distribution gear and two central gears of a transmission dividing train arranged in front of this first multiple power path, on the one side, and of a transmission dividing train, arranged in the rear of the same extent as this first multiple power path, on the other side;

(c) arrangement respectively of a second multiple power path from each of these two central gears to a lower transmission dividing train, on the one side, and to an upper transmission dividing train of the same extent, on the other side;

(d) non-supported arrangement of these two central gears respectively in the plane of the axes of the corresponding gears of these transmission dividing trains;

(e) arrangement respectively of a tumbler-born intermediary gear in each of these four multiple power paths; and (f) power collection to the two helix-shaft gears respectively by means each of these intermediary gears from the lower and/or upper multiple power paths, which engage respectively the corresponding helix-shaft gears.

BRIEF DESCRIPTION OF THE DRAWING

The objects, advantages and features of the invention will be more fully appreciated from the following detailed description when read in conjunction with the accompanying drawing in which.

DESCRIPTION OF THE PREFERRED EMBODIMENT

Figure 2:
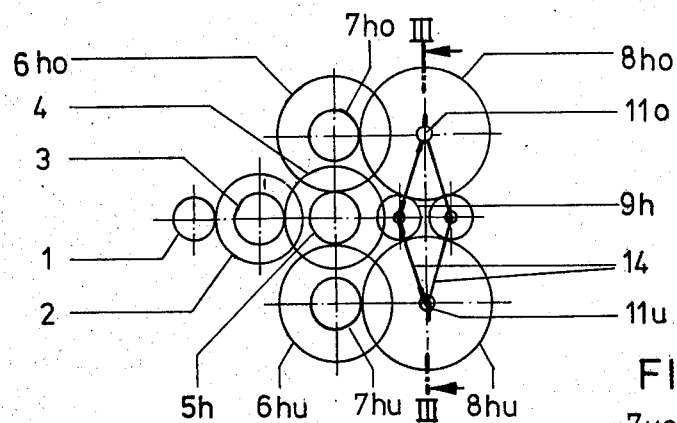
FIG. 2 is a schematic view of the rear multiple power transmission gears, viewed from the front.
Figure 3:
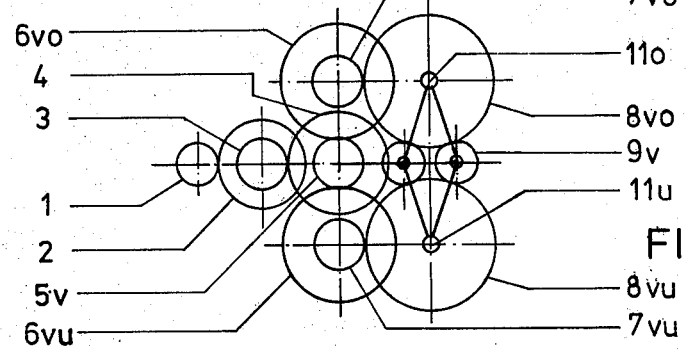
FIG. 3 is a schematic view of the front multiple power transmission gears, viewed from the front.
Figure 1:
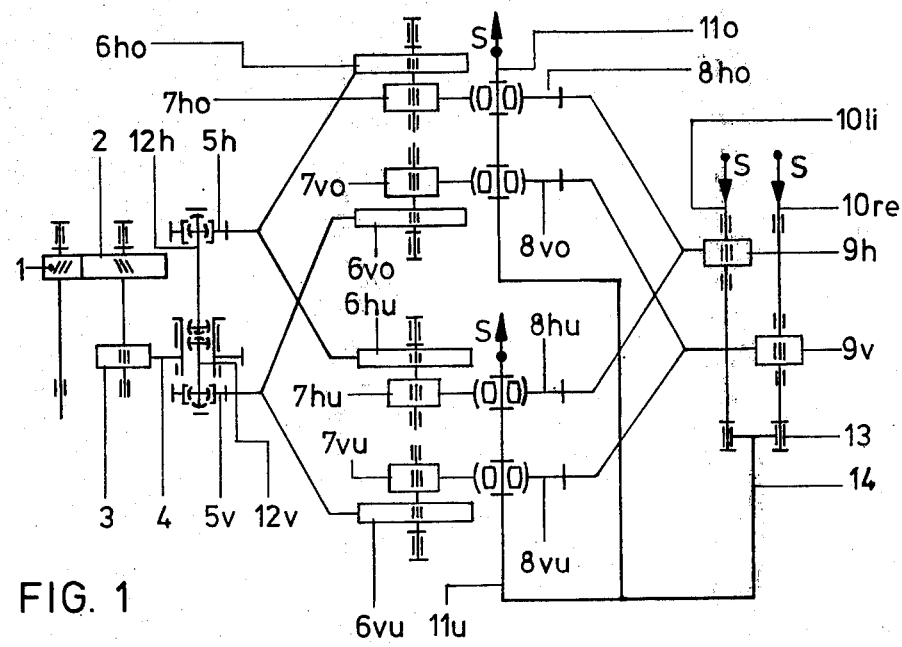
FIG. 1 is a schematic top view of the gear configuration of the invention.
Figure 7:
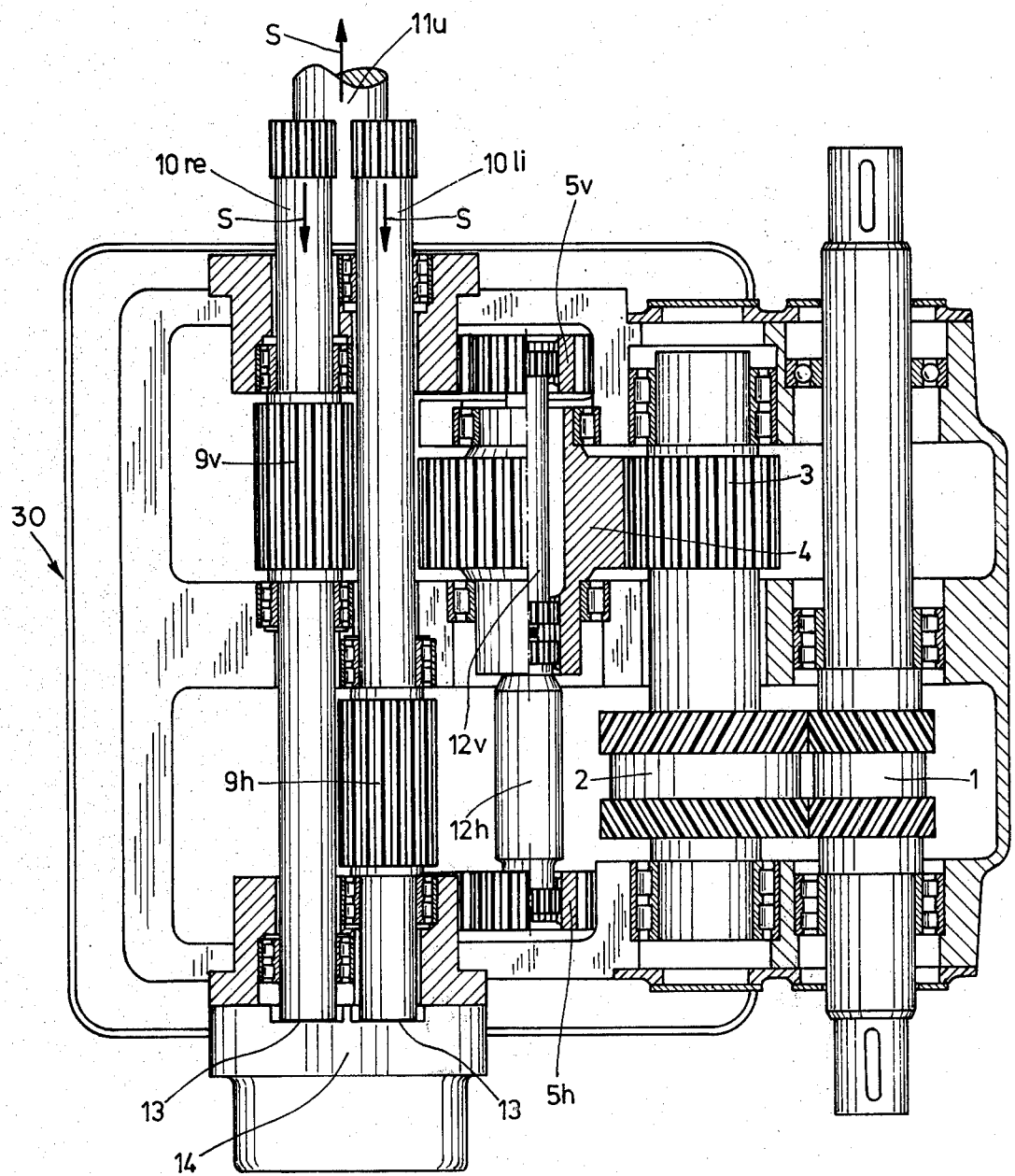
FIG. 7 is a horizontal sectional view taken along the plane VII—VII in FIG. 5, whereby however the drive is turned on the horizontal plane by 180°, so that now its front side is oriented toward the upper edge of the drawing sheet.

In the embodiment of the invention illustrated in the drawing the drive of the gear assembly is provided by a drive motor, which is not shown, to the shaft of a toothed gear 1. Gears 1, 2 and 3, 4 (FIGS. 1–3 and 7) constitute two transmission gear stages which reduce the motor revolutions. From a distribution gear 4, which is hollow and has in its interior cylindrical internal teeth for two double joint toothed couplings, there is a first multiple power path provided by two double joint toothed coupling shafts $12v$ and $12h$ respectively to a central gear $5v$ and thereby to a transmission dividing train arranged in a frontal position, on the one side, and to a central gear $5h$ and thereby to a transmission dividing train arranged in a rear position, on the other side.

The frontal central gear $5v$ engages, without actually being mounted in a real bearing, a gear $6vu$ located under it and a gear $6vo$ located above it, whereby the frontal transmission dividing train is further branched into a frontal lower and a frontal upper transmission dividing train. The rearward central gear $5h$ engages, similarly without being mounted in an actual bearing, a gear $6hu$ located under it and a gear $6ho$ located above it, whereby the rearward transmission dividing train is further branched into a rearward lower and a rearward upper transmission dividing train. The unsupported central gears $5v$ and $5h$ are arranged in the plane of the axes of the gears $6vu$ and $6vo$, and $6hu$ and $6ho$ respectively.

Figure 6:
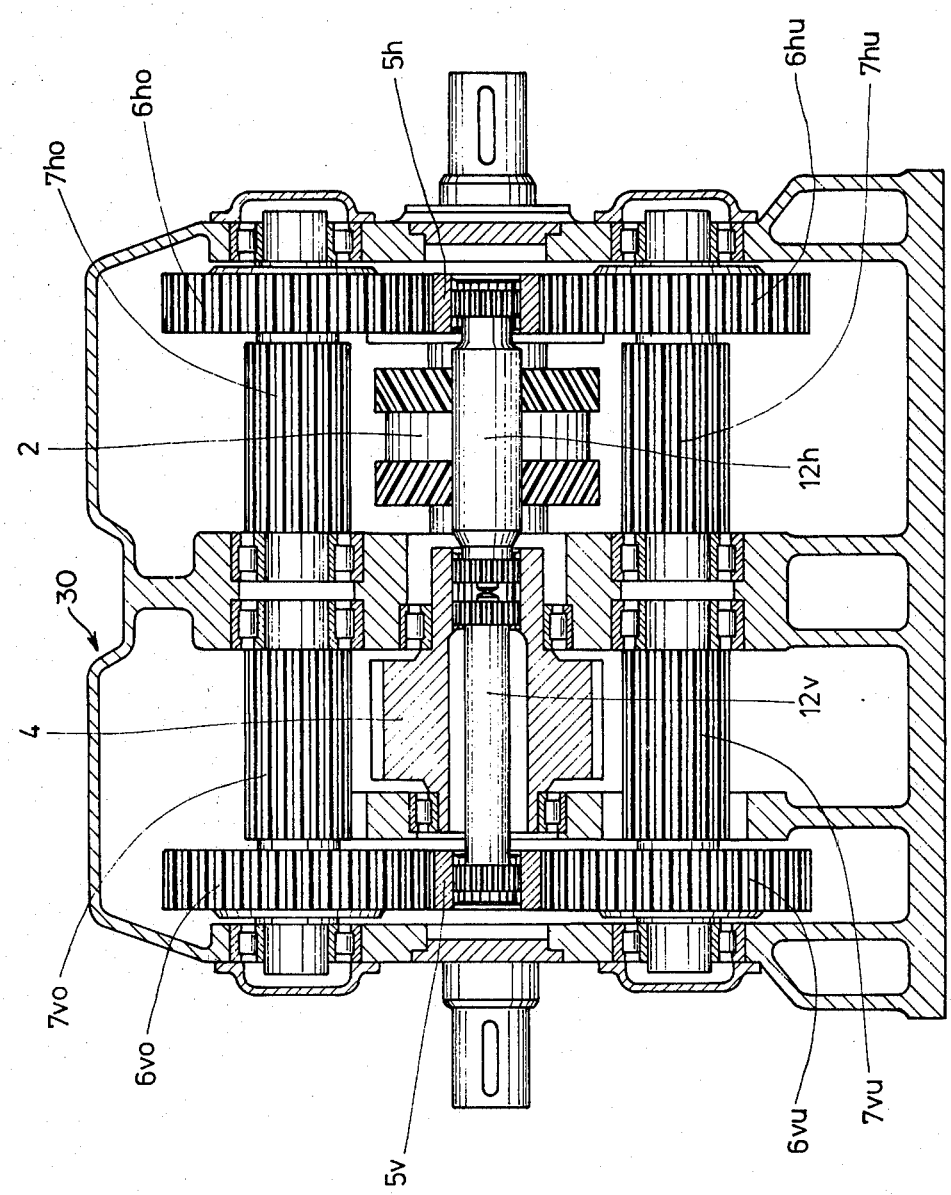
FIG. 6 is a vertical sectional view taken along the plane VI—VI in FIG. 5.
Figure 8:
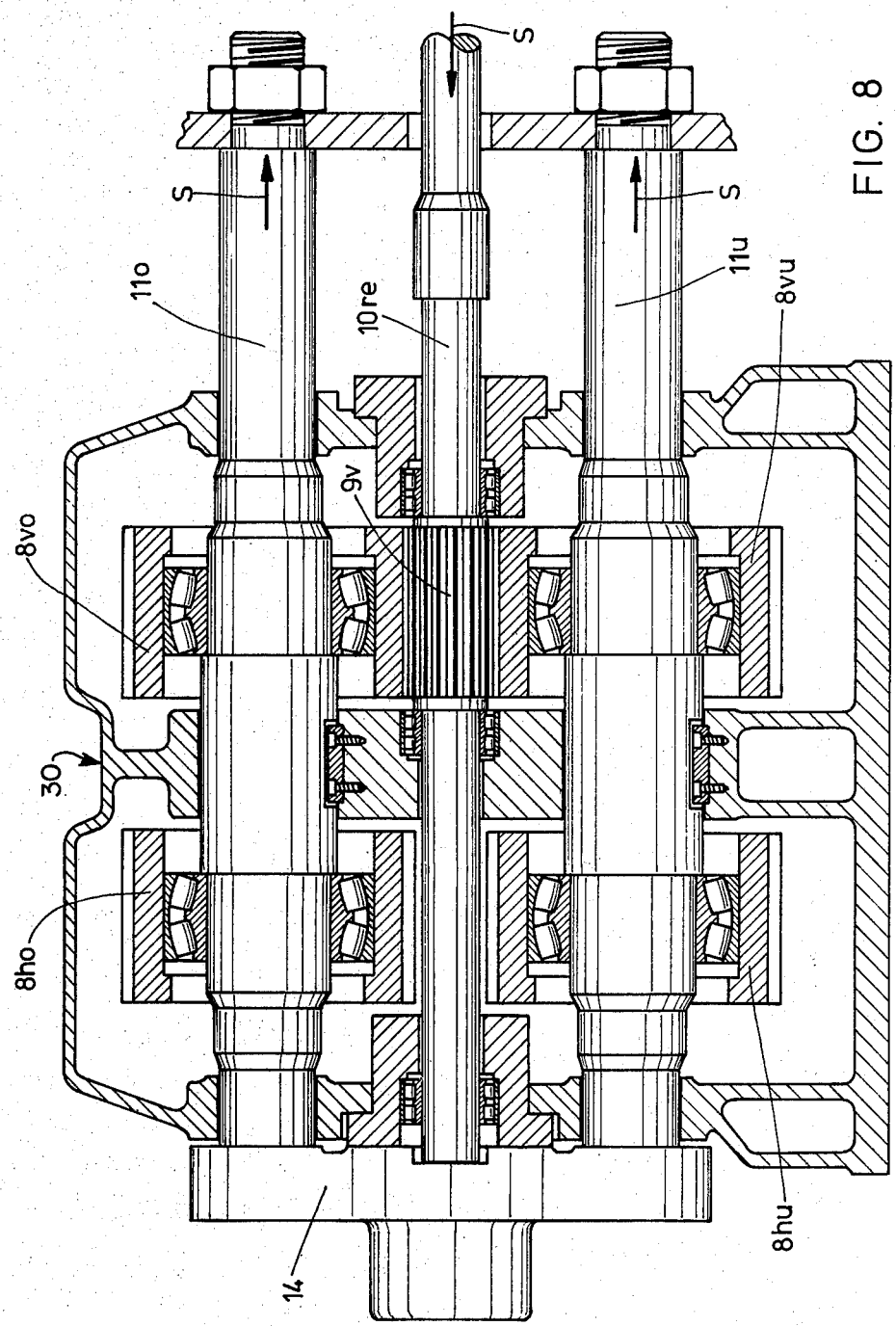
FIG. 8 is a vertical sectional view taken along the plane VIII—VIII in FIG. 5.
Figure 9:
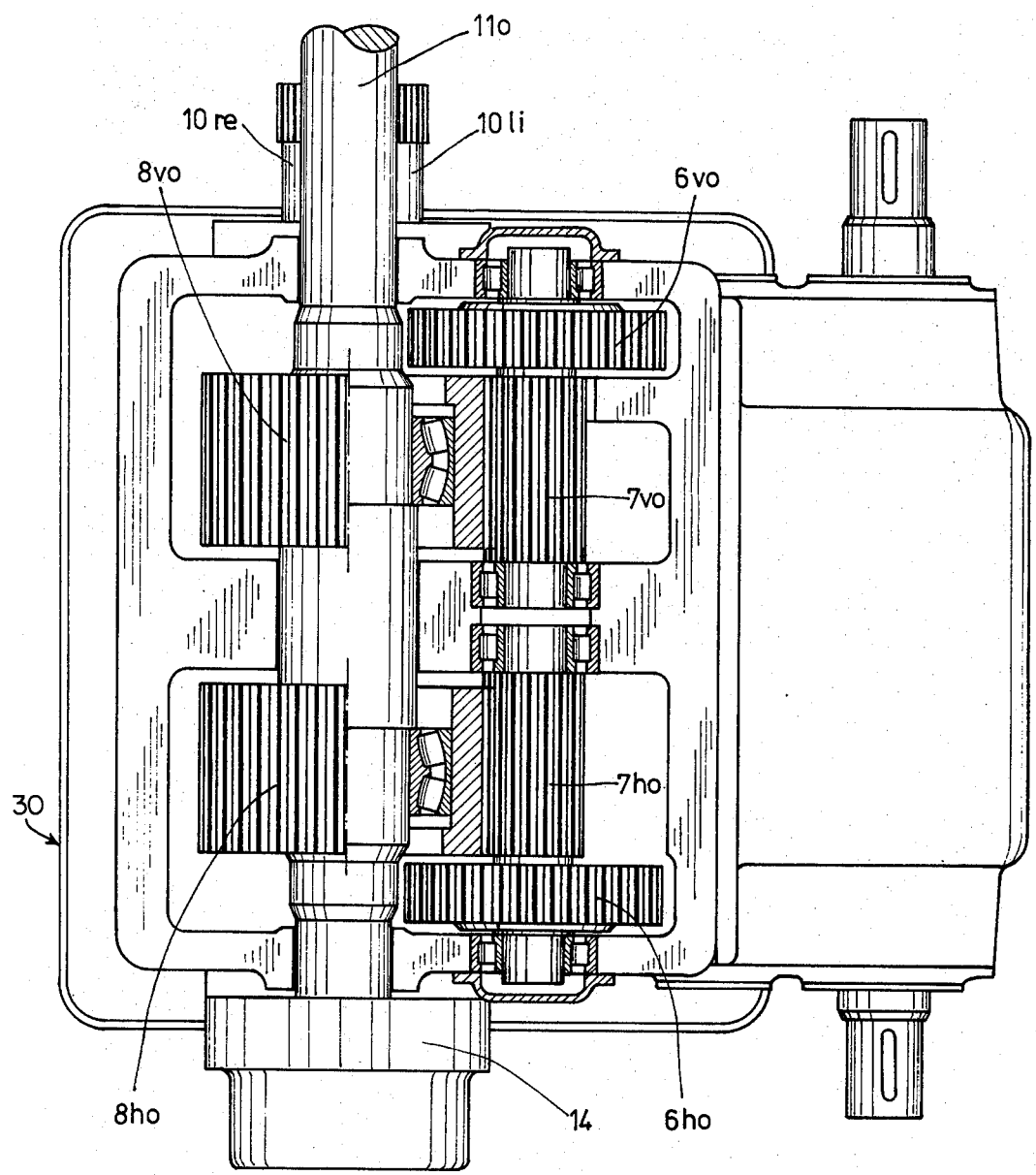
FIG. 9 is a horizontal sectional view taken along the plane IX—IX in FIG. 5.
Figure 10:
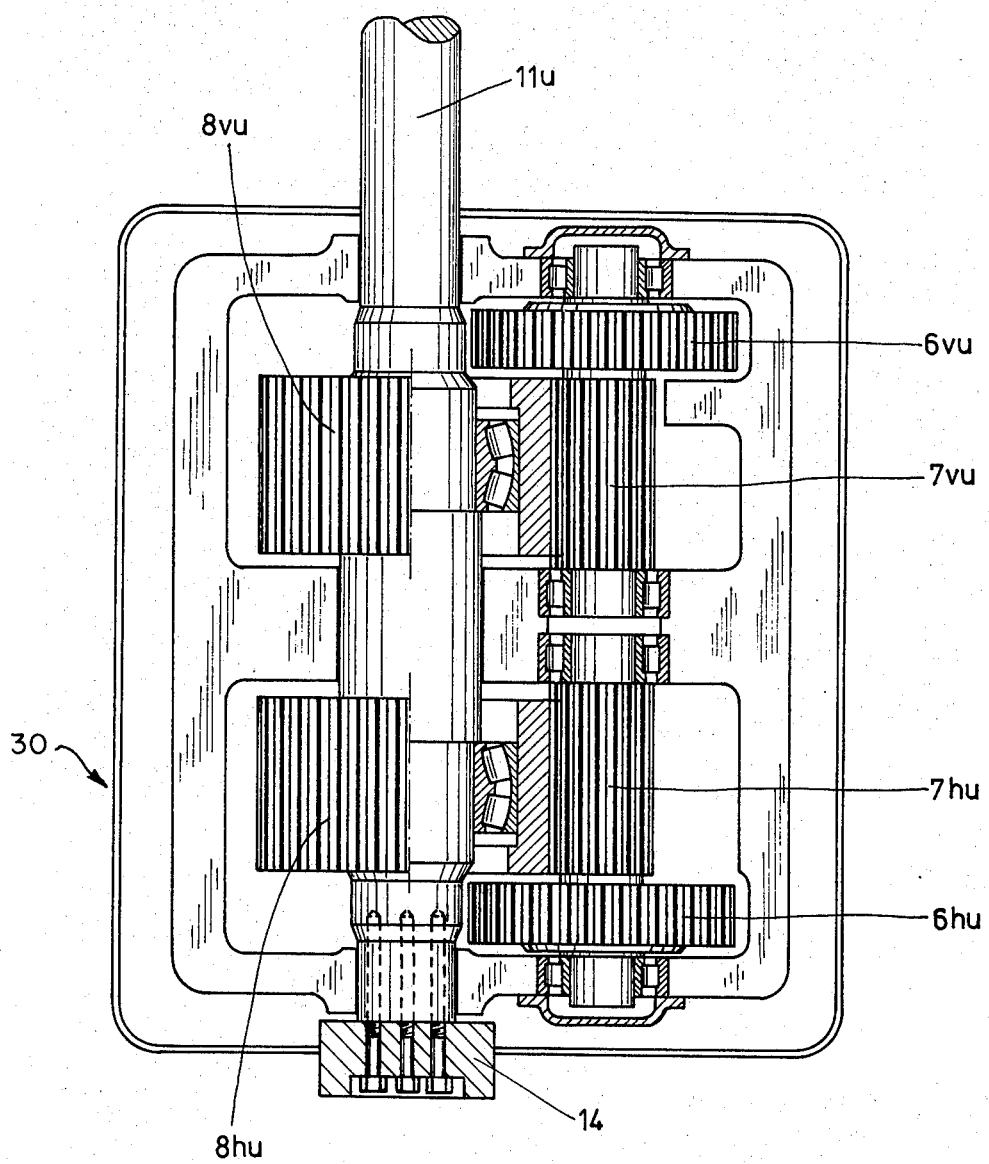
FIG. 10 is a horizontal sectional view taken along the plane X—X in FIG. 5.

By virtue of the gear configuration described to this point, in reference to FIGS. 1–3 and 6–10, there is manifested from the multiple power-transmission or distribution gear $4a$ doubled multiple power transmission path in four trains. From each of the toothed gears 6 there is effected the further drive over its associated shaft, a gear 7 and a tumbler-born intermediary gear 8 to a helix-shaft gear 9, whereby the rearward lower intermediary gear $8hu$ and the rearward upper intermediary gear $8ho$ engage the rearward helix-shaft gear $9h$ (shown in FIG. 7 and located behind the shaft of gear $9v$ in FIG. 8) of the left extruder helix shaft $10li$ to provide the power collection, and the frontal lower intermediary gear $8vu$ and the frontal upper intermediary gear $8vo$ engage the frontal helix-shaft gear $9v$ of the right extruder helix shaft $10re$.

As a result of this entire gear configuration there is developed consequently from the power dividing gear 4 a first multiple power transmission path into a frontal transmission division train $5v$-$6vu$-$7vu$-$8vu$-$9v$ and $5v$-$6vo$-$7vo$-$8vo$-$9v$ and into a rearward transmission transmission division train $5h$-$6hu$-$7hu$-$8hu$-$9h$ and $5h$-$6ho$-$7ho$-$8ho$-$9h$. Stated somewhat differently, from the unsupported central gears $5v$ and $5h$ there is each a second multiple power transmission path. Specifically from the frontal central gear $5v$ there is a frontal lower division train $6vu$-$7vu$-$8vu$-$9v$ and a frontal upper division train $6vo$-$7vo$-$8vo$-$9v$. From the rearward central gear $5h$ there is a rearward lower division train $6hu$-$7hu$-$8hu$-$9h$ and a rearward upper division train $6ho$-$7ho$-$8ho$-$9h$. The frontal lower and the frontal upper division trains attribute to the power collection of the frontal helix-shaft gear $9v$ and the rearward lower and the rearward upper division trains attribute to the power collection of the rearward helix-shaft gear $9h$. The synchronous operation of the helices here is effected by the concurrent force of all multiple power transmission trains over the toothed couplings $12v$ and $12h$ upon the first division gear 4 and by the symmetrical configuration of the gear trains of the same extents.

The adjustment of the geometrically perfect and non-contact engagement (exact and synchronous engagement of both extruder helices during rotation without mutual contact) of the extruder helices can be managed when assembling the gearing without a special requirement which would complicate manufacture merely by the steps of extracting one of the toothed coupling shafts $12v$ or $12h$ axially, by rotating one of the extruder helix shafts $10li$ or $10re$ relatively to the other extruder helix shaft (turning the frontal or rearward power division train relatively to the other train without applying any torsional stress to the shafts) and by re-inserting said shaft thereafter. In this context it is of advantage that the transmission ratio of each power transmission path from the respective central gear $5h$ and $5v$ respectively to the respective helix shaft $10li$, $10re$ respectively does reduce the angle of rotation predicated by the pitch of the toothed couplings $12v$ and $12h$ respectively.

The different torsional stiffness of the extruder helix shafts $10li$ and $10re$, which are of different lengths, which is generated by the necessary axially displaced arrangement of the extruder helix shaft hears $9v$ and $9h$, can be compensated by appropriate dimensioning (diameter, length) of the toothed coupling shafts $12v$ and/or $12h$.

Figure 4:
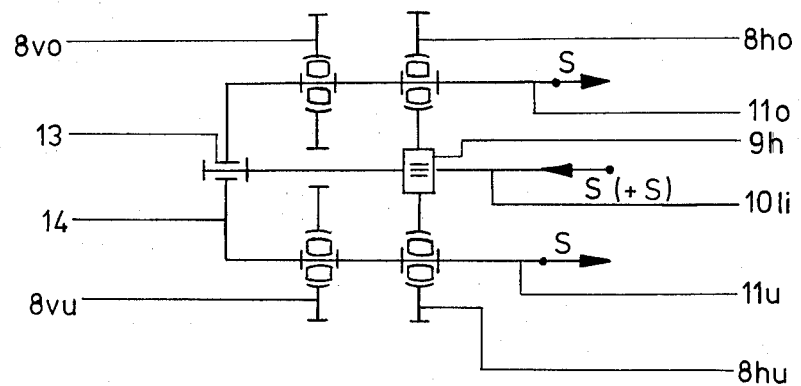
FIG. 4 is a schematic section along the plane III—III in FIG. 2.
Figure 5:
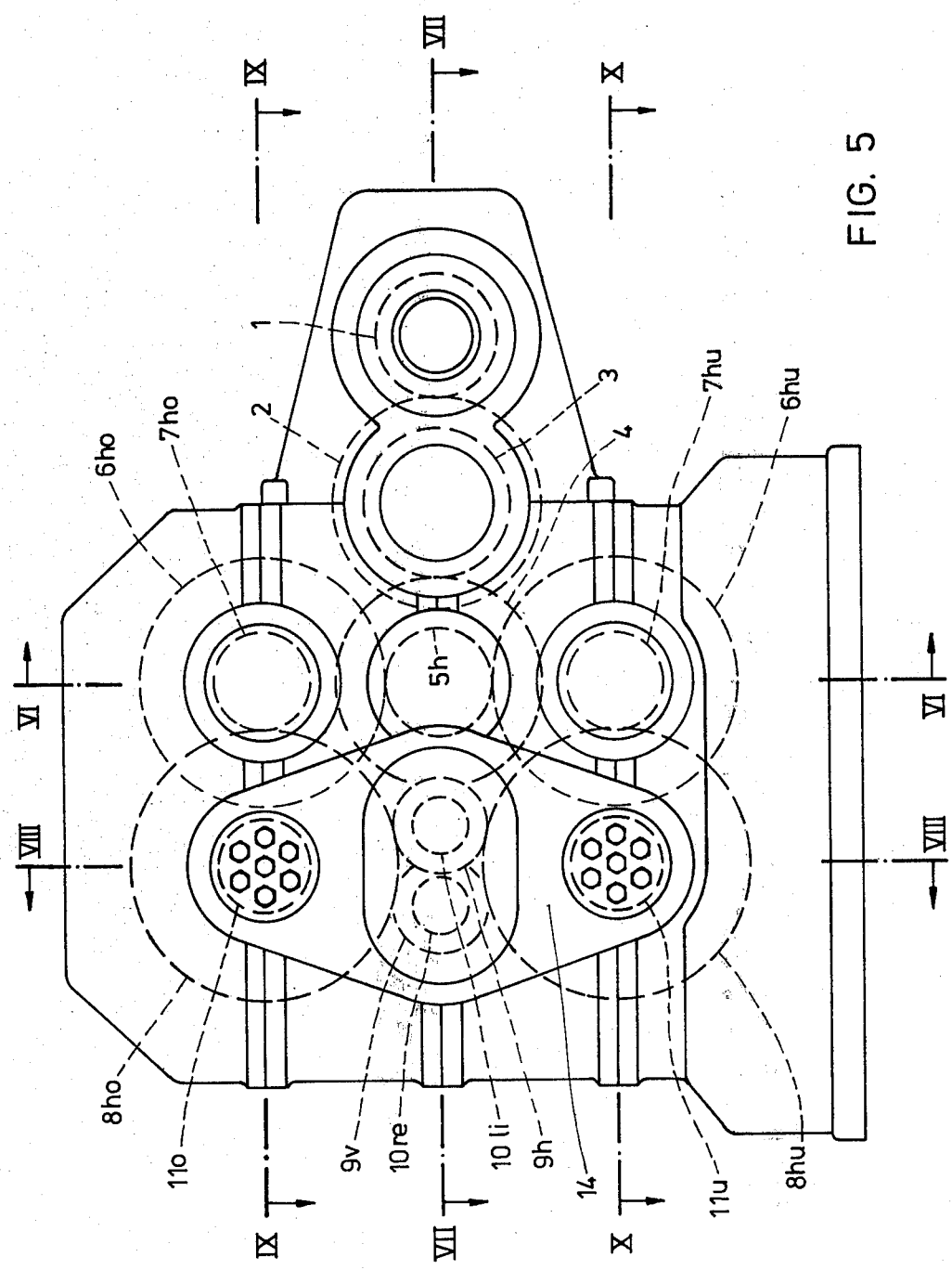
FIG. 5 is a rear view of the gearing arrangement of the invention.

The back pressure forces S and S (FIGS. 1, 4, 7 and 8) impacting from the operation upon the extruder helix shafts $10li$ and $10re$ are conducted by the extruder helix shafts $10li$ and $10re$, being born axially unconfined in the gear housing 30 without affecting said gear housing 30, through a solid collar plate 14, in which the two extruder helix shafts $10li$ and $10re$ are supported axially by the bearings 13, which collar plate conducts such forces further through two tension rods $11u$ and $11o$ back to the extruder housing. These two tension rods $11u$ and $11o$, on which the intermediary gears $8vu$, $8vo$, $8hu$ and $8ho$ are carried in tumbler-bearings, are arranged symmetrically to the plane containing the axes if the two extruder helix shafts $10li$ and $10re$ and on the perpendicular center plane to the two extruder helix shaft axes and can slide axially in the gear housing 30.

The illustration of the drive gear in the sense of the invention shows that with this invention all of the initially stipulated requirements are satisfied in an almost ideal manner and each extruder helix shaft can transmit the maximal torque provided by its geometrical dimensions. By this means an incomplete transverse force compensation is tolerated, as the engagements of the gear teeth 8vu and 8vo and 8hu and 8ho do not occur exactly at a 180° displacement to each other with respect to the helix-shaft gears 9v and 9h assigned to them because the axes of the helix-shafts 9v and 9h respectively and of their drive shafts do not lie in the same plane (see FIGS. 2 and 3). The resulting transverse forces impacting upon the extruder helix-shafts are however only of minor magnitude in the configuration in the sense of the invention. The resulting extruder helix shaft deflections and misalignments of the extruder helix shaft drive gears 9v and 9h are fully compensated however in regard to the gear engagement conditions by means of the arrangement and the effect of the tumbling intermediary gears 8vu, 8vo, 8hu and 8ho.

In view of the above description it is likely that modifications and improvements will occur to those skilled in this art which are within the scope of the appended claims.

What is claimed is:

1. A drive gear assembly for the synchronous rotation of the shafts of a double helix extruder, said gear assembly comprising:
   a housing;
   a first power transmission path mounted to said housing comprising gear reduction means for driving a distribution gear;
   a first double joint toothed coupling shaft engaged with said distribution gear;
   a second double joint toothed coupling shaft engaged with said distribution gear;
   a frontal central gear engaging said first toothed coupling shaft;
   a rearward central gear engaging said second toothed coupling shaft;
   a first extruder helix shaft extending into said housing and being rotatably disposed with respect to said housing;
   a second extruder helix shaft extending into said housing and being rotatably disposed with respect to said housing;
   a frontal lower gear train coupled between said frontal central gear and said first extruder shaft;
   a frontal upper gear train coupled between said frontal central gear and said first extruder shaft;
   a rearward lower gear train coupled between said rearward central gear and said second extruder shaft;
   a rearward upper gear train coupled between said rearward central gear and said second extruder shaft;
   each said gear train including a tumbler-born intermediary gear;
   said frontal central gear being unsupported in said housing and lying in the plane of the axes of the gears to which it engages in both of said frontal upper and lower gear trains; and
   said rearward central gear being unsupported in said housing and lying the plane of the axes of the gears to which it engages in both of said rearward upper and lower gear trains.

2. The drive gear assembly recited in claim 1 and further comprising:
   a solid collar plate providing axial support of said first and second extruder shafts;
   an upper tension rod mounted to said solid collar plate;
   a lower tension rod mounted to said solid collar plate; and
   said upper and lower tension rods lying in a plane symmetrical to the plane through the axes of said first and second extruder shafts and located perpendicularly between said extruder shafts, and also being connected to the extruder housing.

3. The drive gear assembly recited in claim 2 wherein said intermediary gears are mounted by tumbler bearings on said respective tension rods.

4. The drive gear assembly recited in any one of claims 1 to 3 wherein rotation of one of said first and second extruder shafts relative to the respective other extruder shaft can be achieved by rotating only one of said toothed coupling shafts with respect to and independently of the other.

5. The drive gear assembly recited in any one of claims 1 to 3 wherein said extruder shafts have different torsional stiffness and different lengths, respective differences in the diameter and length of said toothed coupling shafts correspondingly compensating and balancing the different torsional stiffnesses and lengths of said extruder shafts.

* * * * *